INFRARED SPECTRUM OF
LINCOMYCIN–TETRAMETHYL AMMONIUM CHLORIDE COMPLEX

PROTON MAGNETIC RESONANCE SPECTRUM OF
LINCOMYCIN–TETRAMETHYL AMMONIUM CHLORIDE COMPLEX

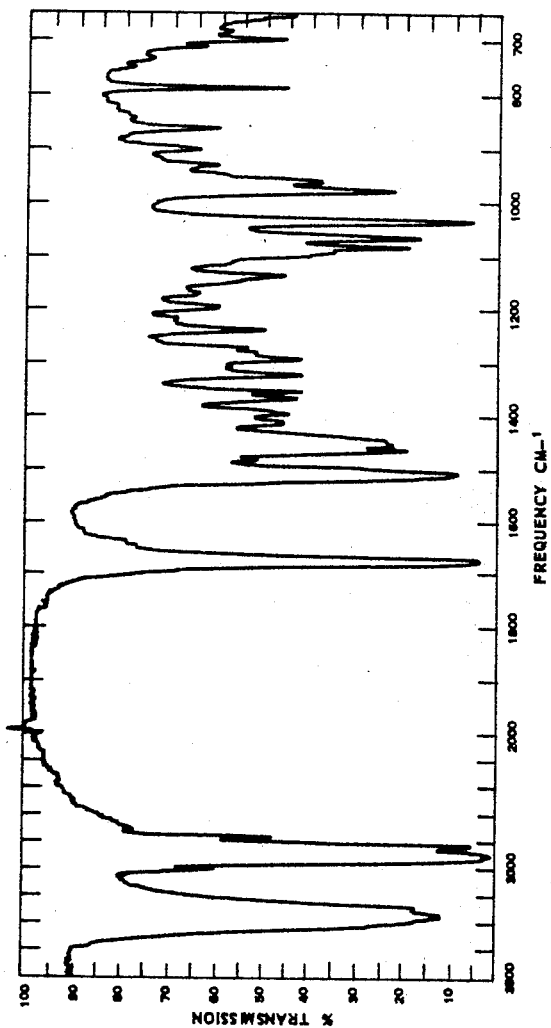

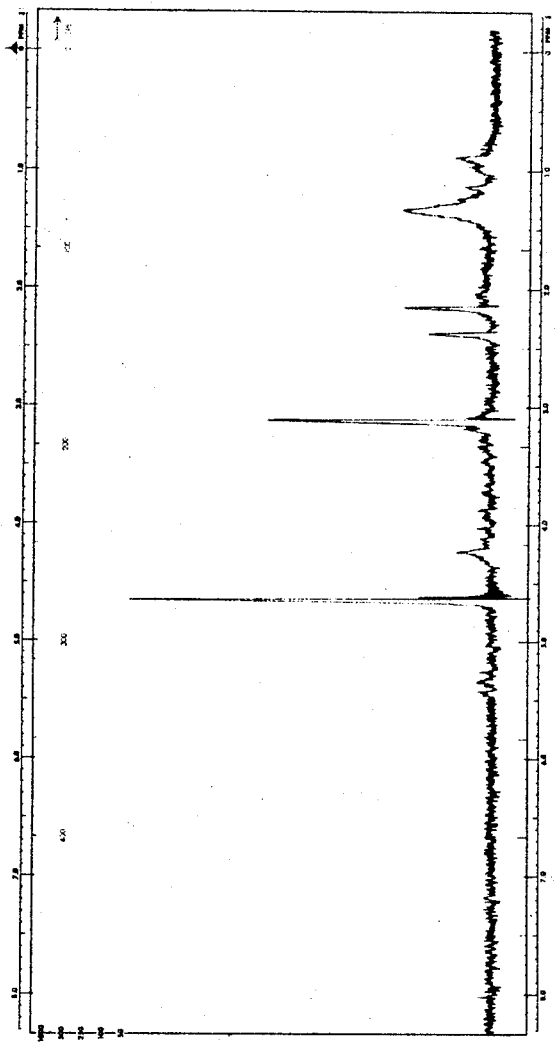

3,448,097
LINCOMYCIN COMPLEXES AND PROCESS FOR
PREPARING THE SAME
Alexander D. Argoudelis, Kalamazoo, Mich., assignor to
The Upjohn Company, Kalamazoo, Mich., a corporation of Delaware
Continuation-in-part of application Ser. No. 622,324,
Mar. 10, 1967. This application Apr. 25, 1967, Ser.
No. 642,620
Int. Cl. C08b 19/00
U.S. Cl. 260—210
8 Claims

ABSTRACT OF THE DISCLOSURE

Novel complexes consisting of one mole of a lincomycin compound and one mole of a tetraalkylammonium halide which are produced by contacting a lincomycin compound free base with a tetraalkylammonium halide, for example, tetramethylammonium chloride. These lincomycin-tetraalkylammonium halide complexes are useful as antibacterials and for upgrading impure lincomycin free base.

This application is a continuation-in-part of application Ser. No. 622,324, filed on Mar. 10, 1967, and now abandoned.

BRIEF SUMMARY OF THE INVENTION

The lincomycin-tetraalkylammonium halide complexes of the subject invention are formed by reacting the free base of a lincomycin compound with a tetraalykylammonium halide of the formula $$R_1R_2R_3R_4N^+[Hal]^-$$

wherein $R_1$, $R_2$, $R_3$, and $R_4$ each are alkyl of from 1 to 8 carbon atoms, inclusive, and the isomeric forms thereof; $N^+$ is nitrogen; and $[Hal]^-$ is a halide ion, for example, chloride, bromide, fluoride and iodide.

Alkyl of from 1 to 8 carbon atoms include straight and branched chain aliphatic hydrocarbon groups such as methyl, ethyl, propyl, isopropyl, butyl, isobutyl, t-butyl, amyl, hexyl, heptyl, octyl, and the like.

The term "a lincomycin compound," as used herein, includes lincomycin as well as lincomycin homologs hereinafter disclosed. Lincomycin compounds which form the novel lincomycin-tetraalkylammonium halide complexes of this invention can be represented by the following formulae:

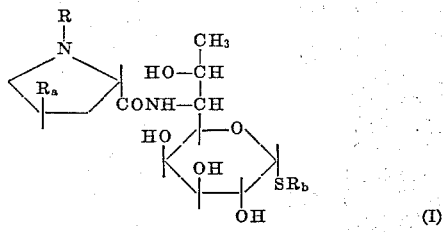
(I)

Lincomycin:
R=CH₃; Rₐ=CH₃CH₂CH₂—; R_b=CH₃
Lincomycin B:
R=CH₃; Rₐ=CH₃CH₂—; R_b=CH₃
Lincomycin C:
R=CH₃; Rₐ=CH₃CH₂CH₂—; R_b=C₂H₅
Lincomycin D:
R=H; Rₐ=CH₃CH₂CH₂—; R_b=CH₃
Lincomycin E:
R=CH₃CH₂—; Rₐ=CH₃CH₂CH₂—; R_b=CH₃

BRIEF DESCRIPTION OF THE DRAWINGS

FIGURE 3 is an infrared spectrum of lincomycin-trioctylmethylammonium chloride complex.
FIGURE 4 is a proton magnetic resonance spectrum of lincomycin-trioctylmethylammonium chloride complex.

DETAILED DESCRIPTION

Figure 1:
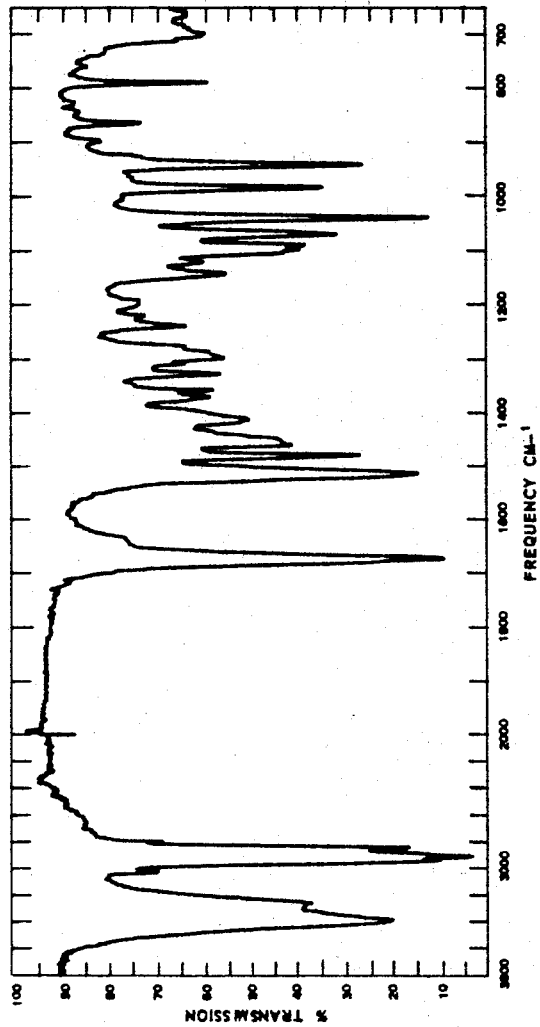
FIGURE 1 is an infrared spectrum of lincomycin-tetramethylammonium chloride complex.

Upon treating 1 mole of the free base of a lincomycin compound, as defined above, at a pH of 7.5 or higher, with at least 1 mole of a tetraalkylammonium halide there is obtained an antibacterially-active lincomycin-tetraalkylammonium halide complex. This novel complex can be isolated in crystalline form. It is relatively stable at a pH in the range of 7.5 to 14.0. Upon acidifying the lincomycin-tetraalkylammonium halide complex with a mineral acid, for example, aqueous hydrochloric acid, to a pH of about 4.0, there is obtained the crystalline lincomycin hydrochloride. This property of the novel complex of the subject invention, i.e., to dissociate at an acidic pH to yield a crystalline salt of lincomycin, makes the complex useful for the recovery and upgrading of crystalline lincomycin salts. For example, in a process for producing crystalline lincomycin hydrochloride, impure lincomycin free base is contacted with a tetraalkylammonium halide at a pH of 7.5 or higher, to form a lincomycin-tetraalkylammonium halide complex. This complex is isolated by adding a loweralkanol, for example, n-butanol, to the reaction mixture. Crystallization of the lincomycin-tetraalkylammonium complex will occur from 1 to 5 hours while the mixture is maintained at room temperature. Elevation of the temperature will shorten the period before crystallization will occur. Advantageously, the temperature should not be adjusted to over 50° C. The crystalline lincomycin-tetraalkylammonium complex is recovered by filtration. Upon treating the recovered crystals with aqueous hydrochloric acid at a pH of about 4.0, followed by concentration of the acidic solution to dryness and recrystallization from a water-acetone mixture, there is obtained crystalline lincomycin hydrochloride. These crystals are recovered by filtration.

The lincomycin free base used to make the novel lincomycin-tetraalkylammonium halide complex of the subject invention can be a relatively pure or impure lincomycin free base. When a relatively pure lincomycin free base is used, an efficient process for producing a lincomycin-tetraalkylammonium halide complex is realized. An impure lincomycin free base, material which has not been purified to a relatively pure crystalline form, will form the novel complex of this invention with generally less efficiency than when relatively pure crystalline lincomycin free base is used. Generally, the cruder the lincomycin free base, the less efficient is the process to make lincomycin-tetraalkylammonium halide complex.

Tetraalkylammonium halides which form the complex of the subject invention have the following structural formula:

$$R_1R_2R_3R_4N^+[Hal]^-$$

$R_1$, $R_2$, $R_3$, and $R_4$ are each alkyl of 1 to 8 carbon atoms; $N^+$ is nitrogen and $[Hal]^-$ is halogen. Examples of such compounds are tetramethylammonium chloride, tetramethylammonium iodide, tetraethylammonium iodide, tetraethylammonium chloride, tetraethylammonium bromide, tetrapropylammonium chloride, tetraisopropylammonium chloride, tetrabutylammonium chloride, tetrapentylammonium chloride, tetrahexylammonium chloride, tetraheptylammonium chloride, tetraoctylammonium chloride, trimethylethylammonium chloride, trimethyloctylammonium chloride, triethylmethylammonium chloride, triethyloctylammonium chloride, tripropylmethylammonium chloride, tripropyloctylammonium chloride, tributylmethylammonium chloride, tributyloctylammonium chloride, tripentylmethylammonium chloride, tripentyloctylammonium chloride, trihexylmethylammonium chloride, trihexyloctylammonium chloride, triheptylmethylammonium chloride, triheptyloctylammonium chloride, dimethyldiethylammonium chloride, dimethyldioctylammonium chloride, diethyldipropylammonium chloride, diethyldioctylammonium chloride, dipropyldibutylammonium chloride, dipropyldioctylammonium chloride, dibutyldipentylammonium chloride, dibutyldioctylammonium chloride, dipentyldihexylammonium chloride, dipentyldioctylammonium chloride, dihexyldiheptylammonium chloride, dihexyldioctylammonium chloride, and the like.

It is critical that the pH of the lincomycin free base be maintained at a pH of 7.5 or higher, in the process of the subject invention, in order to form the novel complexes of the invention.

The lincomycin-tetraalkylammonium halide complexes of the subject invention have antibacterial activity. For example, the antibacterial spectrum of lincomycin-trioctylmethylammonium chloride complex is shown in Table I. This antibacterial spectrum was determined by using a tube dilution assay procedure with the medium being BHI (Brain Heart Infusion Broth, Difco, Detroit, Mich.). Assay tubes (13 mm. x 100 mm.) were prepared in the customary manner as set out in Snell, E. E. Vitamin Methods, volume 1, Academic Press, Inc., New York (1950), p. 327. Test organisms grown for 18 hours at 37° C. were used to inoculate the test medium. The assays were read at 20 hours.

Table I.—Antibacterial activity of lincomycin-trioctylmethylammonium chloride complex (tube dilution assay)

| Test organism: | Minimum inhibitory concentration in mcg./ml. |
|---|---|
| Staphylococcus aureus | 0.8 |
| Streptococcus hemolyticus | 0.8 |
| Streptococcus faecalis | 0.8 |
| Klebsiella pneumoniae | 100 |
| Bacillus subtilis | 50 |

The antibacterial spectrum of lincomycin-tetramethylammonium complex is shown in Table II. This spectrum was determined in the same manner as disclosed for the spectrum given in Table I.

Table II.—Antibacterial activity of lincomycin-tetramethylammonium complex (tube dilution assay)

| Test organism: | Minimum inhibitory concentration in mcg./ml. |
|---|---|
| Staphylococcus aureus | 0.8 |
| Streptococcus hemolyticus | 1.6 |
| Streptococcus faecalis | 0.8 |
| Klebsiella pneumoniae | 100 |
| Bacillus subtilis | 50 |

Thus, the new complexes of the invention can be used to inhibit the microorganism Bacillus subtilis which is a known producer of odors in fish and fish crates. Also, they can be used to inhibit the microorganism Staphylococcus aureus on various dental and medical equipment contaminated with this organism; and they can be used as disinfectants on washed and stacked food utensils contaminated with Staphylococcus aureus. Also, these compounds are useful in wash solutions for sanitation purposes, as in the washing of hands and the cleaning of equipment, floors, or furnishings of contaminated rooms or laboratories; and they are also useful as industrial preservatives, for example, as bacteriostatic rinse for laundered clothes and for impregnating papers and fabrics; and they are useful for suppressing the growth of sensitive organisms in plate assays and other microbiological media. They also can be used as feed supplements to promote the growth of animals, for example, mammals, birds, fish, and reptiles.

Preparation of lincomycin and lincomycin homologs

Lincomycin can be prepared by the procedure disclosed in U.S. Patent 3,086,912.

Lincomycin B can be prepared by the procedure disclosed in Argoudelis, A. D., Fox, J. A., and Eble, T. E., Biochemistry, (1965) 4, 698.

Lincomycin C can be prepared by the procedure disclosed in Argoudelis, A. D., and Mason, D. J., Biochemistry, 4, 704–709 (1965) at p. 705. The microorganism disclosed in U.S. Patent 3,086,912 can be used in the fermentation procedure disclosed in Biochemistry, 4, pp. 704–705.

Lincomycin D can be prepared by the procedure disclosed in South African Patent 65/2,184.

Lincomycin E can be prepared by the procedure disclosed in South African Patent 65/2,854.

The following examples are illustrative of the process and products of the present invention, but are not to be construed as limiting. All percentages are by weight and all solvent mixture proportions are by volume unless otherwise noted.

EXAMPLE 1

Lincomycin-tetramethylammonium chloride complex

A solution of tetramethylammonium chloride (16 ml., containing about 11 mmoles of tetramethylammonium chloride) was mixed with 5 g. of lincomycin free base at a pH of 7.5. n-Butanol (10 ml.) was added to the solution and the mixture was concentrated to a thick, oily residue. Crystallization started after the residue stood at room temperature for 1 hour. Trituration of the crystals with acetone (30 ml.) followed by filtration afforded 5 g. of crystalline lincomycin-tetramethylammonium chloride complex having the following characteristics.

*Elemental analyses.*—Calcd. for

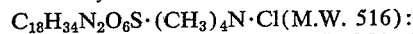

C, 51.20; H, 8.98; N, 8.14; Cl, 6.87; S, 6.21; O, 18.60. Found: C, 49.99; H, 9.09; N, 7.93; Cl, 8.10; S, 5.91.

Infrared absorption spectrum: Lincomycin-tetramethylammonium chloride complex has a characteristic infrared absorption spectrum as reproduced in FIGURE 1 of the drawing. Lincomycin-tetramethylammonium chloride complex shows bands at the following wave-lengths expressed in reciprocal centimeters:

| | |
|---|---|
| 3400 (s.) | 1226 (w.) |
| 3270 (m.) | 1200 (w.) |
| 3030 (w.) | 1148 (m.) |
| 3020 (w.) | 1127 (w.) |
| 3010 (w.) | 1112 (m.) |
| 2950 (s.) (oil) | 1103 (m.) |
| 2920 (s.) (oil) | 1097 (m.) |
| 2865 (s.) | 1078 (m.) |
| 2850 (s.) (oil) | 1047 (s.) |
| 1678 (s.) | 1010 (w.) |
| 1644 (w.) | 990 (m.) |
| 1520 (s.) | 948 (s.) |
| 1486 (s.) | 903 (w.) |
| 1463 (m.) | 870 (w.) |
| 1458 (m.) (oil) | 850 (w.) |
| 1423 (m.) | 835 (w.) |
| 1375 (m.) (oil) | 795 (m.) |
| 1362 (m.) | 790 (w.) |
| 1332 (m.) | 740 (w.) |
| 1315 (w.) | 717 (w.) |
| 1305 (m.) | 705 (m.) |
| 1292 (m.) | 690 (w.) |
| 1282 (w.) | 665 (w.) |
| 1245 (w.) | 645 (m.) |

Infrared absorption band intensities throughout this specification are indicated as "s.," "m.," and "w.," respectively, and are approximated in terms of the background in the vicinity of the band. An "s." band is of the same order of intensity as the strongest in the spectrum; "m." bands are between one-third and two-thirds as intense as the strongest band; and "w." bands are less than one-third as intense as the strongest band. These estimates are made on the basis of a percent transmission scale.

Figure 2:
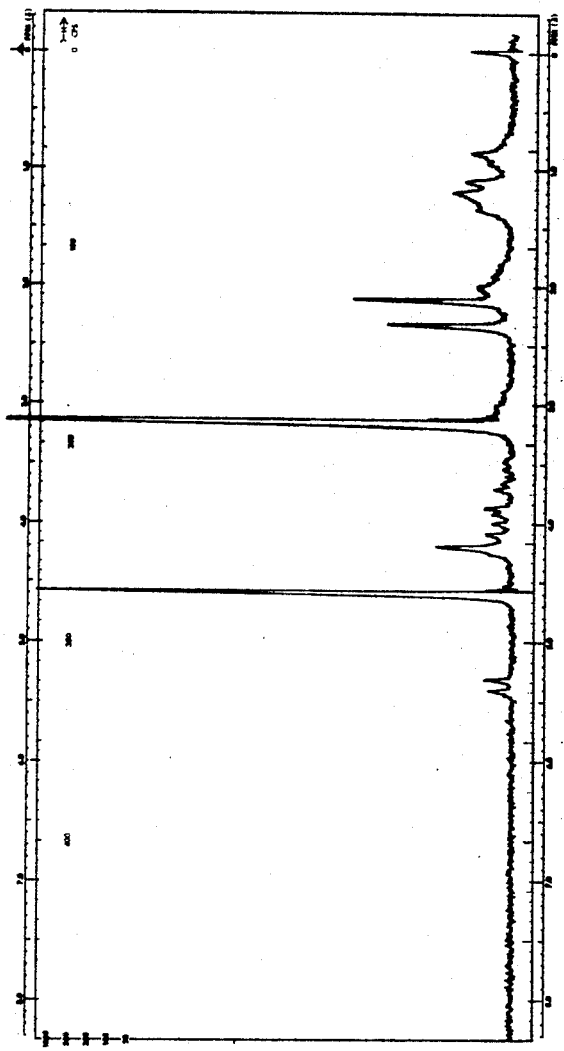
FIGURE 2 is a proton magnetic resonance spectrum of lincomycin-tetramethylammonium chloride complex.

Proton magnetic resonance spectrum: Lincomycin-tetramethylammonium chloride complex has a characteristic proton magnetic resonance spectrum as shown in FIGURE 2 of the drawing. This spectrum, generally referred to as an NMR spectrum, was observed on a Varian A-60 spectrometer on a solution (ca. 0.5 ml., ca. 0.2 molar) of the sample of lincomycin-tetramethyl ammonium chloride complex in deuterium oxide. The spectrum was calibrated against internal 2,2-dimethyl-2-silapentane-5-sulfonate and the precision of the $\Delta\sim$ was now $>\pm1$ c.p.s. Frequencies were recorded in p.p.m. downfield from 2,2-dimethyl-2-silapentane-5-sulfonate.

EXAMPLE 2

Lincomycin-trioctylmethylammonium chloride complex

By substituting the tetramethylammonium chloride in Example 1 by trioctylmethylammonium chloride, there is obtained lincomycin-trioctylmethylammonium chloride complex having the following characteristics.

*Elemental analyses.*—Calcd. for

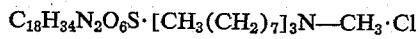
$C_{18}H_{34}N_2O_6S \cdot [CH_3(CH_2)_7]_3N—CH_3 \cdot Cl$

C, 63.71; H, 10.94; N, 5.18; Cl, 4.37; S, 3.96; O, 11.84; M.W., 810.7.

Infrared absorption spectrum: Lincomycin-trioctylmethylammonium chloride complex has a characteristic infrared absorption spectrum as reproduced in FIGURE 3 of the drawing. Lincomycin-trioctylmethylammonium chloride complex shows bands at the following wavelengths expressed in reciprocal centimeters:

| | |
|---|---|
| 3410 (s.) | 1206 (m.) |
| 3370 (s.) | 1182 (w.) |
| 3315 (s.) | 1157 (m.) |
| 3020 (m.) | 1148 (m.) |
| 2950 (s.) (oil) | 1122 (m.) |
| 2920 (s.) (oil) | 1110 (m.) |
| 2850 (s.) (oil) | 1103 (m.) |
| 2785 (m.) | 1093 (s.) |
| 2720 (w.) | 1076 (s.) |
| 1686 (s.) | 1045 (s.) |
| 1520 (s.) | 987 (s.) |
| 1492 (m.) | 971 (m.) |
| 1475 (s.) | 960 (m.) |
| 1465 (s.) | 940 (w.) |
| 1455 (s.) (oil) | 928 (w.) |
| 1420 (m.) | 911 (w.) |
| 1405 (m.) | 872 (m.) |
| 1376 (m.) (oil) | 850 (w.) |
| 1364 (m.) | 796 (m.) |
| 1332 (m.) | 758 (w.) |
| 1315 (m. | 742 (w.) |
| 1303 (m.) | 720 (w.) |
| 1292 (m.) | 706 (m.) |
| 1282 (m.) | 692 (m.) |
| 1250 (m.) | 660 (m.) |
| 1226 (w.) | |

Proton magnetic resonance spectrum: Lincomycin-trioctylmethylammonium chloride complex has a characteristic proton magnetic resonance spectrum as reproduced in FIGURE 4 of the drawing. The operating conditions for the determination of the spectrum are the same as disclosed for the spectrum reproduced in FIGURE 2 of the drawing.

EXAMPLE 3

By substituting lincomycin B, or lincomycin C, or lincomycin D, or lincomycin E, for lincomycin in Example 1, there are obtained:

Lincomycin B-tetramethylammonium chloride complex.
Calcd. for $C_{17}H_{32}N_2O_6S \cdot (CH_3)_4N \cdot Cl$: C, 50.23; H, 8.83; N, 8.37; O, 19.12; S, 6.39; Cl, 7.06; M.W., 502.1.

Lincomycin C-tetramethylammonium chloride complex.
Calcd. for $C_{19}H_{36}N_2O_6S \cdot (CH_3)_4N \cdot Cl$: C, 52.11; H, 9.13; N, 7.93; O, 18.11; S, 6.05; Cl, 6.69; M.W., 530.2.

Lincomycin D-tetramethylammonium chloride complex. Calcd. for $C_{17}H_{32}N_2O_6S \cdot (CH_3)_4N \cdot Cl$: C, 50.23; H, 8.83; N, 8.37; O, 19.12; S, 6.39; Cl, 7.06; M.W., 502.1.

Lincomycin E-tetramethylammonium chloride complex. Calcd. for $C_{19}H_{36}N_2O_6S \cdot (CH_3)_4N \cdot Cl$: C, 52.11; H, 9.13; N, 7.93; O, 18.11; S, 6.05; Cl, 6.69; M.W., 530.2.

EXAMPLE 4

By substituting lincomycin B, or lincomycin C, or lincomycin D, or lincomycin E for lincomycin in Example 2, there are obtained:

Lincomycin B-trioctylmethylammonium chloride complex. Calcd. for $C_{17}H_{32}N_2O_6S \cdot [CH_3(CH_2)_7]_3N—CH_3 \cdot Cl$: C, 63.32; H, 10.88; N, 5.27; O, 12.05; S, 4.02; Cl, 4.45; M.W., 796.68.

Lincomycin C-trioctylmethylammonium chloride complex. Calcd. for $C_{19}H_{36}N_2O_6S \cdot [CH_3(CH_2)_7]_3N—CH_3 \cdot Cl$: C, 64.08; H, 11.00; N, 5.10; O, 11.64; S, 3.89; Cl, 4.30; M.W., 824.7.

Lincomycin D-trioctylmethylammonium chloride complex. Calcd. for $C_{17}H_{32}N_2O_6S \cdot [CH_3(CH_2)_7]_3N—CH_3 \cdot Cl$: C, 63.32; H, 10.88; N, 5.27; O, 12.05; S, 4.02; Cl, 4.45; M.W., 796.7.

Lincomycin E-trioctylmethylammonium chloride complex. Calcd. for $C_{19}H_{36}N_2O_6S \cdot [CH_3(CH_2)_7]_3N—CH_3 \cdot Cl$: C, 64.08; H, 11.00; N, 5.10; O, 11.64; S, 3.89; Cl, 4.30; M.W. 824.7.

EXAMPLE 5

By substituting tetraethylammonium iodide, or tetrapropylammonium chloride, or tetraisopropylammonium chloride, or tetrabutylammonium chloride, or tetrapentylammonium chloride, or tetrahexylammonium chloride, or tetraheptylammonium chloride, or tetraoctylammonium chloride, for the tetramethylammonium chloride in Example 1, there are obtained:

Lincomycin-tetraethylammonium iodide complex. Calcd. for $C_{18}H_{34}N_2O_6S \cdot (CH_3CH_2)_4N \cdot I$: C, 47.05; H, 8.20; N, 6.33; O, 14.46; S, 4.83; I, 19.12; M.W., 663.7.

Lincomycin-tetrapropylammonium chloride complex. Calcd. for $C_{18}H_{34}N_2O_6S \cdot (CH_3CH_2CH_2)_4N \cdot Cl$: C, 57.34; H, 9.95; N, 6.69; O, 15.28; S, 5.10; Cl, 5.64; M.W., 628.4.

Lincomycin-tetraisopropylammonium chloride complex.

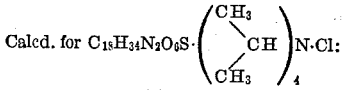
Calcd. for $C_{18}H_{34}N_2O_6S \cdot \left(\begin{array}{c}CH_3\\ \phantom{x}\\ CH_3\end{array}\Big\rangle CH\right)_4 N \cdot Cl$:

C, 57.34; H, 9.95; N, 6.69; O, 15.28; S, 5.10; Cl, 5.64; M.W., 628.4.

Lincomycin-tetrabutylammonium chloride complex. Calcd. for $C_{18}H_{34}N_2O_6S \cdot (CH_3CH_2CH_2CH_2)_4N \cdot Cl$: C, 59.66; H, 10.31; N, 6.14; O, 14.02; S, 4.68; Cl, 5.18; M.W., 684.5.

Lincomycin-tetrapentylammonium chloride complex. Calcd. for $C_{18}H_{34}N_2O_6S \cdot (CH_3CH_2CH_2CH_2CH_2)_4N \cdot Cl$: C, 61.53; H, 10.62; N, 5.67; O, 12.96; S, 4.33; Cl, 4.79; M.W., 740.6.

Lincomycin-tetrahexylammonium chloride complex. Calcd. for $C_{18}H_{34}N_2O_6S \cdot [CH_3(CH_2)_5]_4N \cdot Cl$: C, 63.32; H, 10.88; N, 5.27; O, 12.05; S, 4.02; Cl, 4.45; M.W., 796.7.

Lincomycin-tetraheptylammonium chloride complex. Calcd. for $C_{18}H_{34}N_2O_6S \cdot [CH_3(CH_2)_6]_4N \cdot Cl$: C, 64.78; H, 11.11; N, 4.93; O, 11.25; S, 3.76; Cl, 4.16; M.W., 852.7.

Lincomycin-tetraoctylammonium chloride complex. Calcd. for $C_{18}H_{34}N_2O_6S \cdot [CH_3(CH_2)_7]_4N \cdot Cl$: C, 66.07; H, 11.31; N, 4.62; O, 10.56; S, 3.53; Cl, 3.90; M.W., 908.9.

EXAMPLE 6

By substituting trimethylethylammonium chloride, or trimethyloctylammonium chloride, or triethylmethylammonium chloride, or triethyloctylammonium chloride, or tripropylmethylammonium chloride, or tripropyloctylammonium chloride, or tributylmethylammonium chloride, or tributyloctylammonium chloride, or tripentylmethylammonium chloride, or tripentyloctylammonium chloride, or trihexylmethylammonium chloride, or trihexyloctylammonium chloride, or triheptylmethylammonium chloride, or triheptyloctylammonium chloride, for the trioctylmethylammonium chloride in Example 2, there are obtained:

Lincomycin-trimethylethylammonium chloride complex. Calcd. for $C_{18}H_{34}N_2O_6S \cdot (CH_3)_3N{-}CH_2CH_3 \cdot Cl$:
C, 52.11; H, 9.13; N, 7.93; O, 18.11; S, 6.05; Cl, 6.69; M.W., 530.17.

Lincomycin-trimethyloctylammonium chloride complex. Calcd. for $$C_{18}H_{34}N_2O_6S \cdot [(CH_3)_3N{-}CH_2(CH_2)_6CH_3]Cl:$$

C, 56.70; H, 9.84; N, 6.84; O, 15.63; S, 5.22; Cl, 5.77; M.W., 614.3.

Lincomycin-triethylmethylammonium chloride complex. Calcd. for $C_{18}H_{34}N_2O_6S \cdot (CH_3CH_2)_3N{-}CH_3 \cdot Cl$:
C, 53.90; H, 9.41; N, 7.54; O, 17.24; S, 5.78; Cl, 6.37; M.W., 557.5.

Lincomycin-triethyloctylammonium chloride complex. Calcd. for $$C_{18}H_{34}N_2O_6S \cdot [(CH_3CH_2)_3N \cdot CH_2(CH_2)_6CH_3]Cl:$$

C, 58.55; H, 10.14; N, 6.40; O, 14.62; S, 4.88; Cl, 5.40; M.W., 656.4.

Lincomycin-tripropylmethylammonium chloride complex. Calcd. for $$C_{18}H_{34}N_2O_6S \cdot [(CH_3CH_2CH_2)_3N \cdot CH_3]Cl:$$

C, 56.02; H, 9.74; N, 7.00; O, 15.99; S, 5.34; Cl, 5.91; M.W., 600.3.

Lincomycin-tripropyloctylammonium chloride complex. Calcd. for $$C_{18}H_{34}N_2O_6S \cdot [(CH_3CH_2CH_2)_3N \cdot CH_2(CH_2)_6CH_3]Cl:$$

C, 60.18; H, 10.39; N, 6.02; O, 13.74; S, 4.59; Cl, 5.08; M.W., 698.5.

Lincomycin-tributylmethylammonium chloride complex. Calcd. for $$C_{18}H_{34}N_2O_6S \cdot [CH_3CH_2CH_2CH_2]_4N \cdot CH_3 \cdot Cl:$$

C, 57.96; H, 10.04; N, 6.54; O, 14.94; S, 4.99; Cl, 5.52; M.W., 642.4.

Lincomycin-tributyloctylammonium chloride complex. Calcd. for $$C_{18}H_{34}N_2O_6S \cdot [(CH_3CH_2CH_2CH_2)_3N \cdot CH_2(CH_2)_6CH_3]Cl:$$

C, 61.63; H, 10.62; N, 5.67; O, 12.96; S, 4.33; Cl, 4.79; M.W., 740.6.

Lincomycin-tripentylmethylammonium chloride complex. Calcd. for $$C_{18}H_{34}N_2O_6S \cdot [(CH_3(CH_2)_3CH_2)_3N \cdot CH_3]Cl:$$

C, 64.08; H, 9.18; N, 5.47; O, 12.49; S, 4.17; Cl, 4.61; M.W., 768.5.

Lincomycin-tripentyloctylammonium chloride complex. Calcd. for $$C_{18}H_{34}N_2O_6S \cdot [(CH_3(CH_2)_3CH_2)_3N \cdot CH_2(CH_2)_6CH_3]Cl:$$

C, 62.92; H, 10.82; N, 5.37; O, 12.27; S, 4.10; Cl, 4.53; M.W., 782.6.

Lincomycin-trihexylmethylammonium chloride complex. Calcd. for $$C_{18}H_{34}N_2O_6S \cdot [CH_3(CH_2)_4CH_2]_3N \cdot CH_3 \cdot Cl:$$

C, 61.17; H, 10.54; N, 5.78; O, 13.21; S, 4.41; Cl, 4.88; M.W., 726.5.

Lincomycin-trihexyloctylammonium chloride complex. Calcd. for $$C_{18}H_{34}N_2O_6S \cdot [CH_3(CH_2)_4CH_2]_3N \cdot CH_2(CH_2)_6CH_3 \cdot Cl:$$

C, 64.08; H, 11.00; N, 5.10; O, 11.64; S, 3.89; Cl, 4.30; M.W., 824.7.

Lincomycin-triheptyloctylammonium chloride complex. Calcd. for $$C_{18}H_{34}N_2O_6S \cdot [CH_3(CH_2)_5CH_2]_3N \cdot CH_2(CH_2)_6CH_3 \cdot Cl:$$

C, 65.12; H, 11.16; N, 4.85; O, 11.07; S, 3.70; Cl, 4.09; N.W., 866.8.

EXAMPLE 7

By substituting lincomycin B, or lincomycin C, or lincomycin D, or lincomycin E, for lincomycin in Example 5 there are obtained the corresponding lincomycin B-, lincomycin C-, lincomycin D-, and lincomycin E-tetraalkylammonium chloride complexes.

EXAMPLE 8

By substituting lincomycin B, lincomycin C, lincomycin D, and lincomycin E, for lincomycin in Example 6 there are obtained the corresponding lincomycin B-, lincomycin C-, lincomycin D-, and lincomycin E-trialkylmonoalkylammonium chloride complexes.

EXAMPLE 9

By substituting dimethylethylammonium chloride, dimethyldioctylammonium chloride, diethyldipropylammonium chloride, diethyldioctylammonium chloride, dipropyldibutylammonium chloride, dipropyldioctylammonium chloride, dibutyldipentylammonium chloride, dibutyldioctylammonium chloride, dipentyldihexylammonium chloride, dipentyldioctylammonium chloride, dihexyldiheptylammonium chloride, and dihexyldioctylammonium chloride, for tetramethylammonium chloride in Example 1, there is obtained:

Lincomycin-dimethyldiethylammonium chloride complex. Calcd. for $C_{18}H_{34}N_2O_6S \cdot (CH_3CH_2)N \cdot (CH_3)_2Cl$:
C, 52.97; H, 9.26; N, 7.72; O, 17.64; S, 5.89; Cl, 6.51; M.W., 544.2.

Lincomycin-dimethyldioctylammonium chloride complex. Calcd. for $$C_{18}H_{34}N_2O_6S \cdot (CH_3)_2N[CH_2(CH_2)_6CH_3]_2Cl:$$

C, 60.69; H, 10.47; N, 5.90; O, 13.47; S, 4.50; Cl, 4.98; M.W., 712.5.

Lincomycin-diethyldipropylammonium chloride complex. Calcd. for $$C_{18}H_{34}N_2O_6S \cdot (CH_3CH_2)_2N(CH_2CH_2CH_3)_2Cl:$$

C, 56.02; H, 9.74; N, 7.00; O, 15.99; S, 5.34; Cl, 5.91; M.W., 600.3.

Lincomycin-diethyldioctylammonium chloride complex. Calcd. for $$C_{18}H_{34}N_2O_6S \cdot (CH_3CH_2)_2N[CH_2(CH_2)_6CH_3]_2Cl:$$

C, 61.63; H, 10.62; N, 5.67; O, 12.96; S, 4.33; Cl, 4.79; M.W., 740.6.

Lincomycin-dipropyldibutylammonium chloride complex. Calcd. for $$C_{18}H_{34}N_2O_6S \cdot (CH_3CH_2CH_2)_2N(CH_2CH_2CH_2CH_3)_2Cl:$$

C, 58.55; H, 10.14; N, 6.40; O, 14.62; S, 4.88; Cl, 5.40; M.W., 656.4.

Lincomycin-dipropyldioctylammonium chloride complex. Calcd. for $$C_{18}H_{34}N_2O_6S \cdot (CH_3CH_2CH_2)_2N[CH_2(CH_2)_6CH_3]_2Cl:$$

C, 62.51; H, 10.75; N, 5.47; O, 12.49; S, 4.17; Cl, 4.61; M.W., 768.6.

Lincomycin-dibutyldipentylammonium chloride complex. Calcd. for $C_{18}H_{34}N_2O_6S \cdot [CH_3(CH_2)_3]_2N[CH_2(CH_2)_3CH_3]Cl$:

C, 60.69; H, 10.47; N, 5.90; O, 13.47; S, 4.50; Cl, 4.98; M.W., 712.5.

Lincomycin-dibutyldioctylammonium chloride complex. Calcd. for $C_{18}H_{34}N_2O_6S \cdot [CH_3(CH_2)_3]_2N[CH_2(CH_2)_6CH_3]_2Cl$:

C, 63.32; H, 10.88; N, 5.27; O, 12.05; S, 4.02; Cl, 4.45; M.W., 796.7.

Lincomycin-dipentyldihexylammonium chloride complex. Calcd. for $C_{18}H_{34}N_2O_6S \cdot [CH_3(CH_2)_4]_2N[CH_2(CH_2)_4CH_3]_2Cl$:

C, 62.51; H, 10.75; N, 5.47; O, 12.49; S, 4.17; Cl, 4.61; M.W., 768.6.

Lincomycin-dipentyldioctylammonium chloride complex. Calcd. for $C_{18}H_{34}N_2O_6S \cdot [CH_3(CH_2)_4]_2N[CH_2(CH_2)_6CH_3]_2 \cdot Cl$:

C, 64.08; H, 11.00; N, 5.10; O, 11.64; S, 3.89; Cl, 4.30; M.W., 824.7.

Lincomycin-dihexyldiheptylammonium chloride complex. Calcd. for $C_{18}H_{34}N_2O_6S \cdot [CH_3(CH_2)_5]_2N[CH_2(CH_2)_5CH_3]_2Cl$:

C, 64.08; H, 10.99; N, 5.09; O, 11.64; S, 3.89; Cl, 4.30; M.W., 824.7.

Lincomycin-dihexyldioctylammonium chloride complex. Calcd. for $C_{18}H_{34}N_2O_6S \cdot [CH_3(CH_2)_5]_2N[CH_2(CH_2)_6CH_3]_2Cl$:

C, 64.79; H, 11.11; N, 4.93; O, 11.26; S, 3.76; Cl, 4.16; M.W., 810.7.

EXAMPLE 10

By substituting lincomycin B, lincomycin C, lincomycin D, and lincomycin E for lincomycin in Example 9 there is obtained the corresponding lincomycin B-, lincomycin C-, lincomycin D-, and lincomycin E-tetraalkylammonium chloride complexes of the general formula

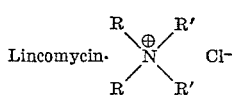

wherein R and R' are different alkyl groups, of from one to eight carbon atoms, inclusive.

I claim:

1. A complex comprising a lincomycin antibiotic of the group consisting of lincomycin, lincomycin B, lincomycin C, lincomycin D, and lincomycin E, and a tetraalkylammonium halide wherein each alkyl group is from 1 to 8 carbon atoms, inclusive, said components being present in the molar ratio of 1:1.

2. The complex, according to claim 1, lincomycin-tetraalkylammonium halide, said components being present in the molar ratio of 1:1.

3. The complex, lincomycin-tetramethylammonium chloride, said components being present in the molar ratio of 1:1.

4. The complex, lincomycin-trioctylmethylammonium chloride, said components being present in the molar ratio of 1:1.

5. A process for producing a lincomycin-tetraalkylammonium halide complex, said components being present in the molar ratio of 1:1, which comprises contacting a lincomycin free base compound of the group consisting of lincomycin, lincomycin B, lincomycin C, lincomycin D, and lincomycin E, at a pH of about 7.5 to 14.0, with a tetraalkylammonium halide wherein each alkyl group is from 1 to 8 carbon atoms, inclusive, and isolating the lincomycin-tetraalkylammonium complex so produced.

6. A process according to claim 5 for the production of lincomycin-tetramethylammonium chloride complex, said components being present in the molar ratio of 1:1, wherein lincomycin free base is contacted, at a pH of about 7.5, with tetramethylammonium chloride and the lincomycin-tetramethylammonium complex, so produced, is isolated.

7. A process according to claim 5 for the production of lincomycin-trioctylmethylammonium chloride complex, said components being present in the molar ratio of 1:1, wherein lincomycin free base is contacted, at a pH of about 7.5, with trioctylmethylammonium chloride and the lincomycin-trioctylmethylammonium chloride complex, so produced, is isolated.

8. A process for upgrading an impure preparation of lincomycin free base which comprises contacting an impure preparation of lincomycin free base, at a pH of about 7.5, with a tetraalkylammonium halide to produce a lincomycin-tetraalkylammonium halide complex, said components being present in the molar ratio of 1:1, contacting the lincomycin-tetraalkylammonium halide complex with an aqueous mineral acid at a pH of about 4.0, and isolating upgraded lincomycin salt.

References Cited

UNITED STATES PATENTS

| | | | |
|---|---|---|---|
| 3,033,750 | 5/1962 | Velluz et al. | 260—211 |
| 3,058,884 | 10/1962 | Mozen et al. | 260—211 |
| 3,264,282 | 8/1966 | Schroeder | 260—210 |

LEWIS GOTTS, Primary Examiner.

J. R. BROWN, Assistant Examiner.

U.S. Cl. X.R.

260—999